United States Patent
Chao et al.

(10) Patent No.: US 8,049,820 B2
(45) Date of Patent: Nov. 1, 2011

(54) VIDEO PROCESSING CIRCUITS AND METHODS USING SAME BUFFER FOR VIDEO DECODER AND CROSS COLOR SUPPRESSOR

(75) Inventors: Po-Wei Chao, Taipei County (TW); I-Hong Chen, Taoyuan County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 1121 days.

(21) Appl. No.: 11/834,016

(22) Filed: Aug. 6, 2007

(65) Prior Publication Data

US 2009/0040387 A1 Feb. 12, 2009

(51) Int. Cl.
*H04N 9/78* (2006.01)
*H04N 5/213* (2006.01)

(52) U.S. Cl. .................. 348/666; 348/624; 348/908
(58) Field of Classification Search .............. 348/624, 348/664–667, 670, 451, 908
See application file for complete search history.

(56) References Cited

U.S. PATENT DOCUMENTS

| 4,706,112 | A | | 11/1987 | Faroudja et al. |
| 5,305,120 | A | | 4/1994 | Faroudja |
| 5,502,509 | A | * | 3/1996 | Kurashita et al. ............. 348/669 |
| 5,519,454 | A | * | 5/1996 | Willis ........................... 348/663 |
| 5,926,228 | A | * | 7/1999 | Jeon et al. ..................... 348/554 |
| 6,091,458 | A | * | 7/2000 | Jeon et al. ..................... 348/554 |

* cited by examiner

*Primary Examiner* — Victor Kostak
(74) *Attorney, Agent, or Firm* — Winston Hsu; Scott Margo

(57) ABSTRACT

A video processing circuit capable of processing a composite signal and a non-composite signal, includes: a line buffer; a frame buffer; a video decoder for decoding the composite signal by utilizing the line buffer and the frame buffer as temporary buffers of the video decoder; a cross color suppressor for performing color suppression on the non-composite signal by utilizing the line buffer and the frame buffer as temporary buffers of the cross color suppressor; and a path controller, coupled to the video decoder and the cross color suppressor, for coupling the line buffer and the frame buffer to the video decoder or the cross color suppressor when utilizing the line buffer and the frame buffer is required.

27 Claims, 12 Drawing Sheets

VIDEO PROCESSING CIRCUITS AND METHODS USING SAME BUFFER FOR VIDEO DECODER AND CROSS COLOR SUPPRESSOR

BACKGROUND

The present invention relates to video processing, and more particularly, to video processing circuits and methods capable of utilizing the same buffers for a cross color suppressor and a video decoder such as a composite signal decoder or a composite signal demodulator.

Please refer to FIG. 1. FIG. 1 is a diagram of a video processing circuit 10 according to the related art, where the video processing circuit 10 comprises a video decoder 12 comprising its own line and frame buffers (not shown), a cross color suppressor 14 comprising its own line and frame buffers (not shown), a de-interlace circuit 16, and a scalar 18. According to the related art, the cross color suppressor 14 is introduced for solving cross color problems. In contrast to a conventional video processing circuit without a cross color suppressor, this kind of architecture as shown in FIG. 1 leads to additional requirements of field/frame buffer(s), line buffer (s), and calculation logic and further leads to additional requirements of memory access bandwidth for these buffers, causing a trade-off between the cross color problems and the additional requirements mentioned above.

SUMMARY

It is therefore an objective of the claimed invention to provide video processing circuits capable of processing a composite signal and a non-composite signal, and to provide related methods, in order to solve the above-mentioned problem.

It is another objective of the claimed invention to provide video processing circuits capable of processing a composite signal and a non-composite signal, and to provide related methods, in order to utilize the same buffers for a cross color suppressor and a video decoder such as a composite signal decoder or a composite signal demodulator.

An exemplary embodiment of a video processing circuit capable of processing a composite signal and a non-composite signal comprises: a line buffer; a frame buffer; a video decoder for decoding the composite signal by utilizing the line buffer and the frame buffer as temporary buffers of the video decoder; a cross color suppressor for performing color suppression on the non-composite signal by utilizing the line buffer and the frame buffer as temporary buffers of the cross color suppressor; and a path controller, coupled to the video decoder and the cross color suppressor, for coupling the line buffer and the frame buffer to the video decoder or the cross color suppressor when utilization of the line buffer and the frame buffer is required.

Being correspondingly disclosed while the aforementioned video processing circuit is provided, an exemplary embodiment of a video processing method capable of processing a composite signal and a non-composite signal comprises: providing a line buffer; providing a frame buffer; decoding the composite signal by utilizing the line buffer and the frame buffer as temporary buffers of a video decoder; performing color suppression on the non-composite signal by utilizing the line buffer and the frame buffer as temporary buffers of a cross color suppressor; and coupling the line buffer and the frame buffer to the video decoder or the cross color suppressor when utilization of the line buffer and the frame buffer is required.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
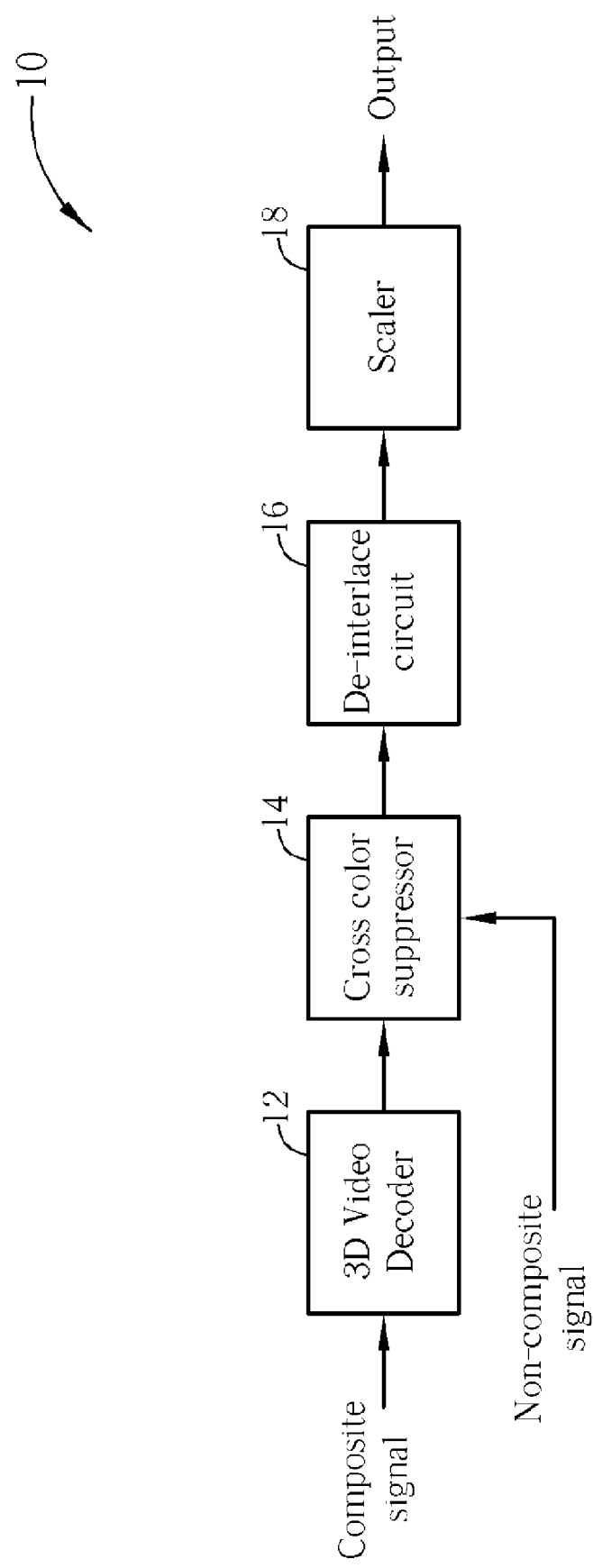
FIG. 1 is a diagram of a video processing circuit according to the related art.
Figure 2:
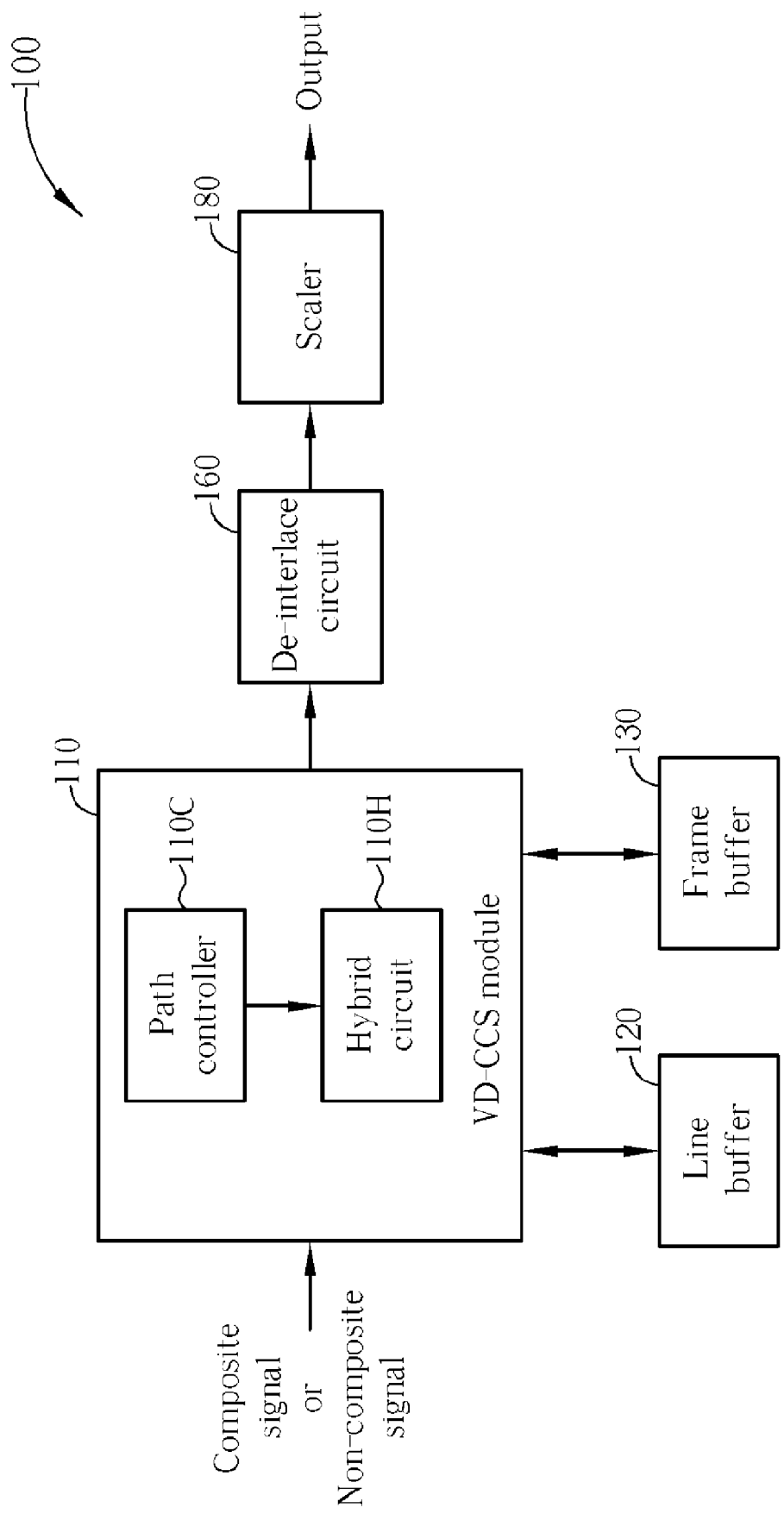
FIG. 2 is a diagram of a video processing circuit capable of processing a composite signal and a non-composite signal according to a first embodiment of the present invention.

Please refer to FIG. 2. FIG. 2 is a diagram of a video processing circuit 100 capable of receiving and processing a composite signal (e.g. a CVBS signal) and a non-composite signal (e.g. an R/G/B signal, a Y/U/V signal, or a Y/Cb/Cr signal) according to a first embodiment of the present invention, where the video processing circuit 100 comprises a video decoder and cross color suppressor (VD-CCS) module 110 comprising a path controller 110C and a hybrid circuit 110H, a line buffer 120, a frame buffer 130, a de-interlace circuit 160, and a scalar 180.

Figure 3:
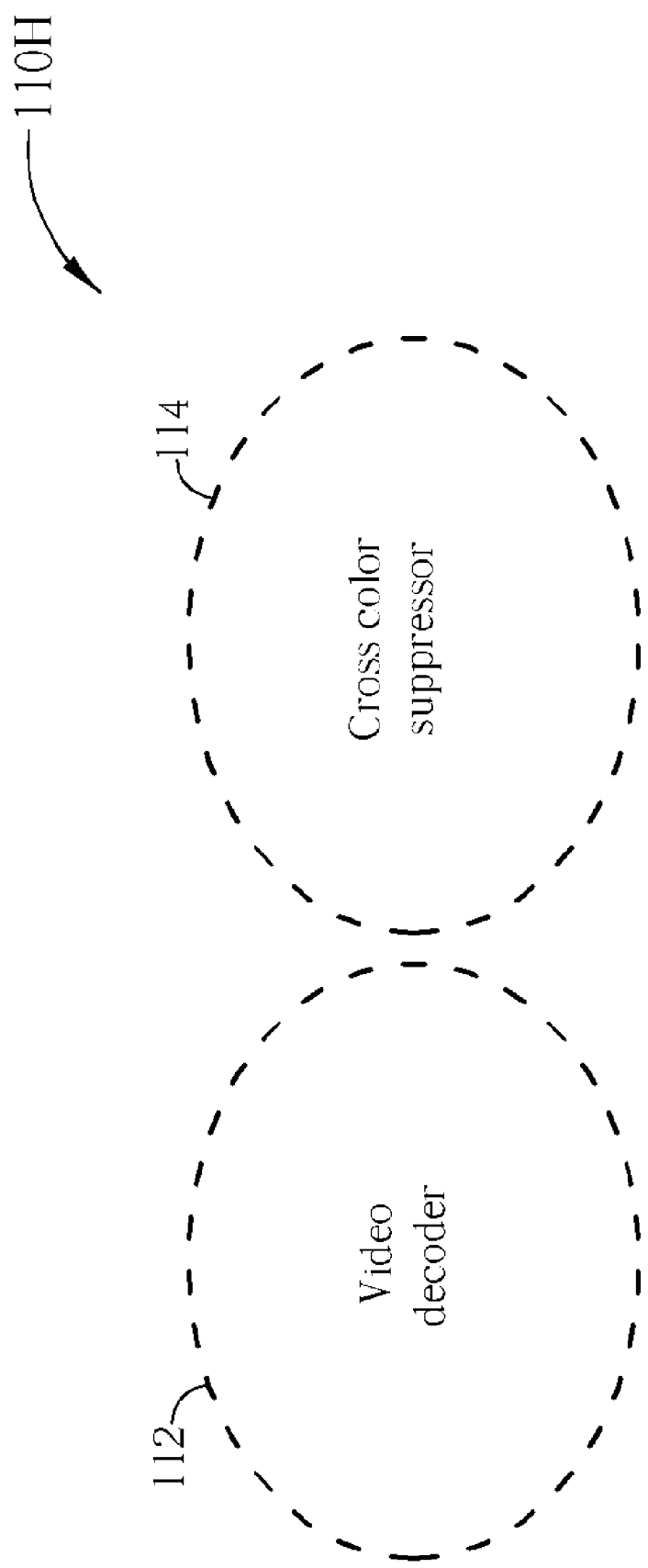
FIG. 3 illustrates logical representatives of a video decoder and a cross color suppressor within the hybrid circuit shown in FIG. 2 according to a first implementation choice of the first embodiment.
Figure 4:
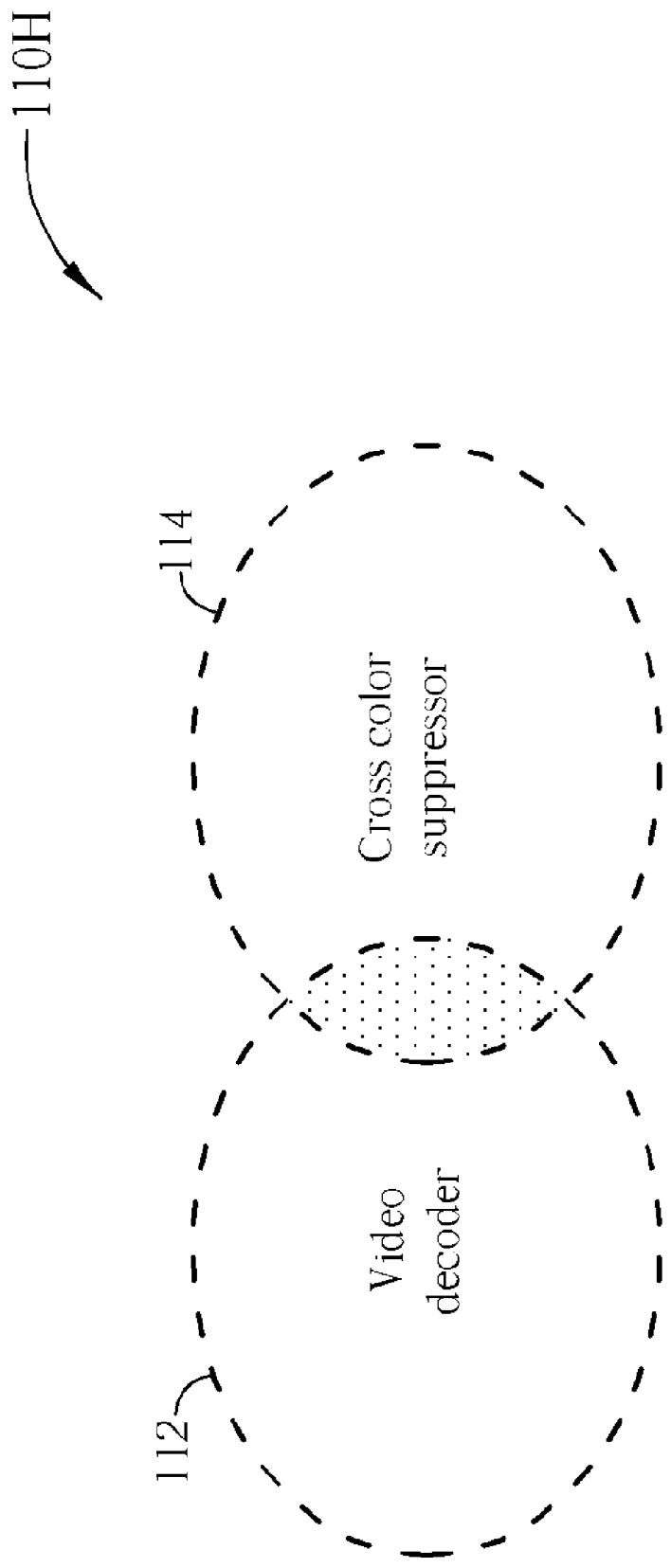
FIG. 4 illustrates logical representatives of a video decoder and a cross color suppressor within the hybrid circuit shown in FIG. 2 according to a second implementation choice of the first embodiment.
Figure 5:
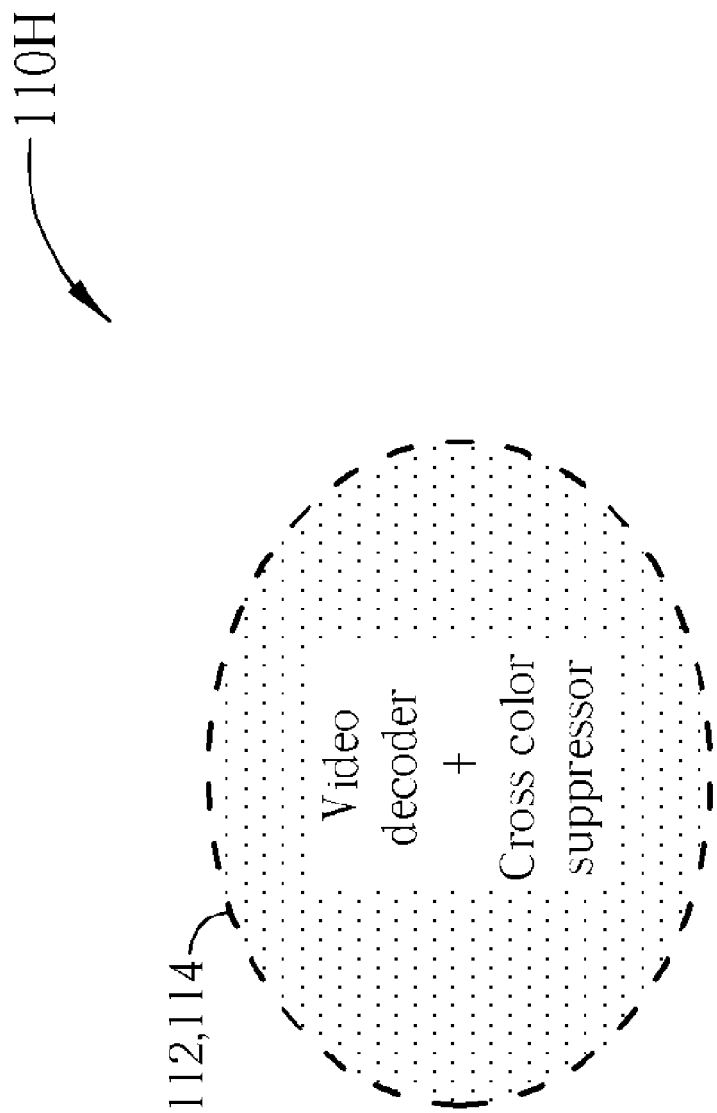
FIG. 5 illustrates logical representatives of a video decoder and a cross color suppressor within the hybrid circuit shown in FIG. 2 according to a third implementation choice of the first embodiment.

FIG. 3, FIG. 4, and FIG. 5 respectively illustrate logical representatives of a video decoder 112 and a cross color suppressor 114 within the hybrid circuit 110H shown in FIG. 2 according to various implementation choices of this embodiment. According to a first implementation choice as shown in FIG. 3, the video decoder 112 and the cross color suppressor 114 can be implemented to be distinct components respectively. According to a second implementation choice as shown in FIG. 4, the video decoder 112 and the cross color suppressor 114 comprise at least one common circuit (i.e. the shaded region in FIG. 4) capable of being temporarily utilized as a portion of the video decoder 112 and capable of being temporarily utilized as a portion of the cross color suppressor 114. According to a third implementation choice, which is a special case of the second implementation choice, the aforementioned common circuit of the video decoder 112 and the cross color suppressor 114 occupies the whole video decoder 112 or the whole cross color suppressor 114, as shown in FIG. 5.

According to this embodiment, no matter which of the implementation choices mentioned above is involved, the video processing circuit 100 comprising the video decoder 112 and the cross color suppressor 114 may utilize the line buffer 120 and the frame buffer 130 as temporary buffers. More specifically, in this embodiment, the video decoder 112 is capable of decoding the composite signal by utilizing the line buffer 120 and the frame buffer 130 as temporary buffers of the video decoder 112. In addition, the cross color suppressor 114 is capable of performing color suppression on the non-composite signal by utilizing the line buffer 120 and the frame buffer 130 as temporary buffers of the cross color suppressor 114.

In this embodiment, the path controller 110C, which is coupled to the video decoder 112 and the cross color suppressor 114 within the hybrid circuit 110H, is capable of coupling the line buffer 120 and the frame buffer 130 to the video decoder 112 or the cross color suppressor 114 when utilization of the line buffer 120 and the frame buffer 130 is required. More particularly, the path controller 110C may determine whether the line buffer 120 and the frame buffer 130 are coupled to the video decoder 112 or the cross color suppressor 114 according to whether the composite signal or the non-composite signal is received. According to this embodiment, the video decoder 112 is active and the cross color suppressor 114 is inactive when the composite signal is received, and the video decoder 112 is inactive and the cross color suppressor 114 is active when the non-composite signal is received. Thus, if the video decoder 112 is active, the path controller 110C may couple the line buffer 120 and the frame buffer 130 to the video decoder 112; otherwise, the path controller 110C may couple the line buffer 120 and the frame buffer 130 to the cross color suppressor 114.

Figure 6:
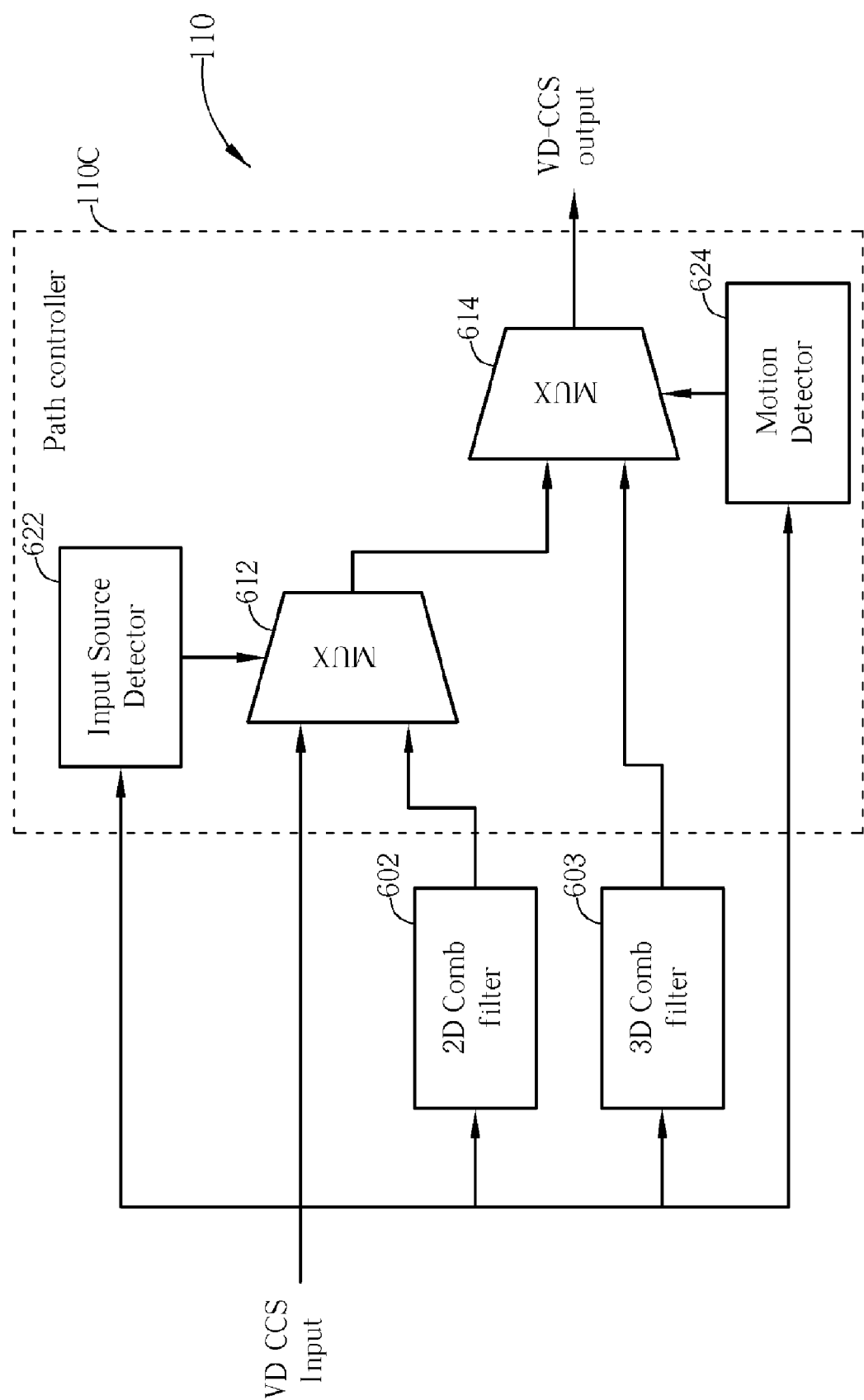
FIG. 6 illustrates signal paths of the video decoder and cross color suppressor (VD-CCS) module shown in FIG. 2 according to the first embodiment.

FIG. 6 illustrates signal paths of the VD-CCS module 110 shown in FIG. 2 according to the first embodiment. As shown in FIG. 6, the path controller 110C comprises a plurality of multiplexers 612 and 614 for multiplexing signal(s) within the video processing circuit 100, and further comprises an input source detector 622 for detecting whether the composite signal or the non-composite signal is received. According to this embodiment, the input source detector 622 controls signal selection of the multiplexer 612 within the path controller 110C. If the composite signal is received, the multiplexer 612 selects a filtered result of a two-dimensional (2D) comb filter 602 within the video processing circuit 100. If the non-composite signal is received, the multiplexer 612 selects the non-composite signal. As shown in FIG. 6, a motion detector 624 within the video processing circuit 100 controls signal selection of the multiplexer 614 within the path controller 110C. If a still image is detected, the multiplexer 614 selects a filtered result of a three-dimensional (3D) comb filter 603 within the video processing circuit 100. If a motion image is detected, the multiplexer 614 selects the output of the multiplexer 612.

Regarding the first implementation choice of this embodiment, some implementation details related to a combination of at least a temporary buffer (e.g. the line buffer 120 or the frame buffer 130) and at least one calculation circuit are further described as follows. Here, each calculation circuit may comprise at least one arithmetic unit, at least one multiplier, and/or at least one amplifier. The video decoder 112 is capable of utilizing a combination of at least the line buffer 120 and at least one calculation circuit as the 2D comb filter 602 when the video decoder 112 is active, and the cross color suppressor 114 is capable of utilizing a combination of at least the line buffer 120 and at least one calculation circuit as a filter when the cross color suppressor 114 is active, where the filter can substantially be equivalent to a variation of the 2D comb filter 602.

In addition, the video decoder 112 is capable of utilizing a combination of at least the frame buffer 130 and at least one calculation circuit as the 3D comb filter 603 when the video decoder 112 is active, and the cross color suppressor 114 is capable of utilizing a combination of at least the frame buffer 130 and at least one calculation circuit as a filter when the cross color suppressor 114 is active, where the filter can substantially be equivalent to a variation of the 3D comb filter 603.

Regarding the second implementation choice or the third implementation choice of this embodiment, some implementation details related to the aforementioned at least one common circuit are further described as follows. Here, each common circuit may comprise at least one arithmetic unit, at least one multiplier, and/or at least one amplifier, each of which is a common component for the video decoder 112 and the cross color suppressor 114. The video decoder 112 is capable of utilizing at least one common circuit and the line buffer 120 as the 2D comb filter 602 when the video decoder 112 is active, and the cross color suppressor 114 is capable of utilizing at least the common circuit and the line buffer 120 as a filter when the cross color suppressor 114 is active, where the filter can substantially be equivalent to the 2D comb filter 602 or a variation of the 2D comb filter 602.

In addition, the video decoder 112 is capable of utilizing at least one common circuit and the frame buffer 130 as the 3D comb filter 603 when the video decoder 112 is active, and the cross color suppressor 114 is capable of utilizing at least the common circuit and the frame buffer 130 as a filter when the cross color suppressor 114 is active, where the filter can substantially be equivalent to the 3D comb filter 603 or a variation of the 3D comb filter 603.

According to a second embodiment, which is a variation of the first embodiment, the video decoder 112 is capable of utilizing at least one common circuit and a frame buffer (e.g. the frame buffer 130) as a first motion detector, and the cross color suppressor 114 is capable of utilizing at least the common circuit and the frame buffer as a second motion detector. According to a variation of the second embodiment, the second motion detector is substantially equivalent to the first motion detector or a variation of the first motion detector.

Figure 7:
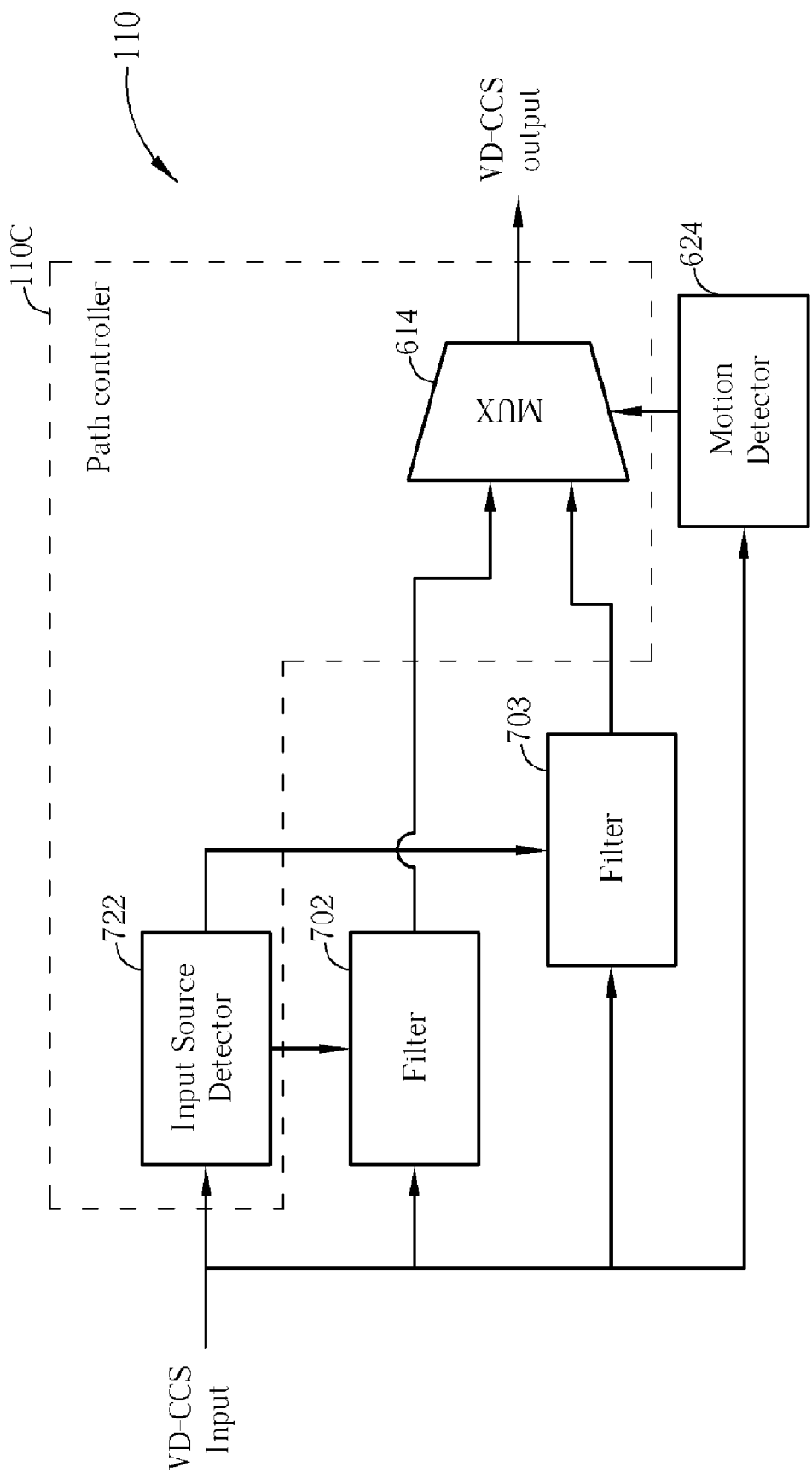
FIG. 7 illustrates signal paths of a VD-CCS module similar to that shown in FIG. 2 according to a variation of the first embodiment.

FIG. 7 illustrates signal paths of a VD-CCS module similar to that shown in FIG. 2 (i.e. the VD-CCS module 110) according to a variation of the first embodiment, where the video decoder 112 is active and the cross color suppressor 114 is inactive when the composite signal is received, and the video decoder 112 is inactive and the cross color suppressor 114 is active when the non-composite signal is received. As shown in FIG. 7, an input source detector 722 is a variation of the input source detector 622, and filters 702 and 703 are variations of the 2D comb filter 602 and the 3D comb filter 603, respectively.

The input source detector 722 of this variation may control different combinations of the temporary buffers and at least one common circuit/calculation circuit for the filters 702 and 703. More specifically, when the video decoder 112 is active, the filter 702 is equivalent to the 2D comb filter 602 mentioned above, and the filter 703 is equivalent to the 3D comb filter 603 mentioned above. In addition, when the cross color suppressor 114 is active, the filter 702 can be a vertical filter, and the filter 703 can be a temporal filter.

Figure 8:
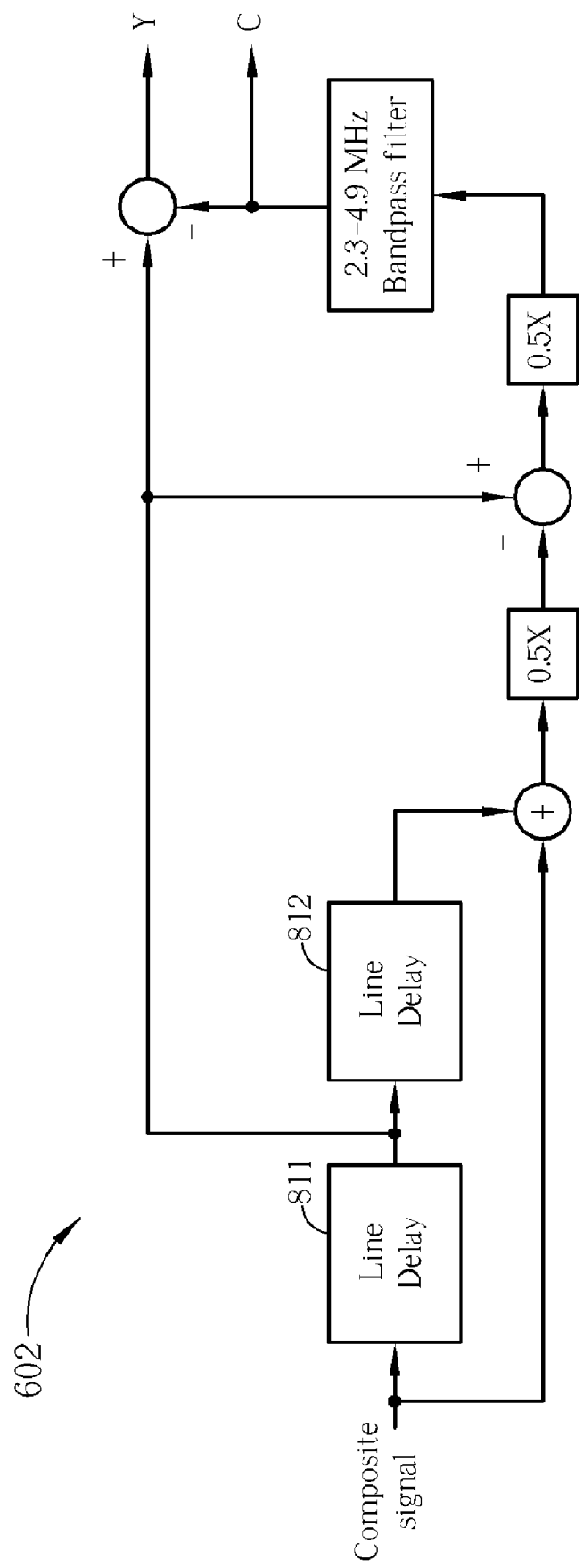
FIG. 8 through FIG. 12 illustrate some implementation details of the VD-CCS module shown in FIG. 2 according to different variations of the first embodiment.
Figure 9:
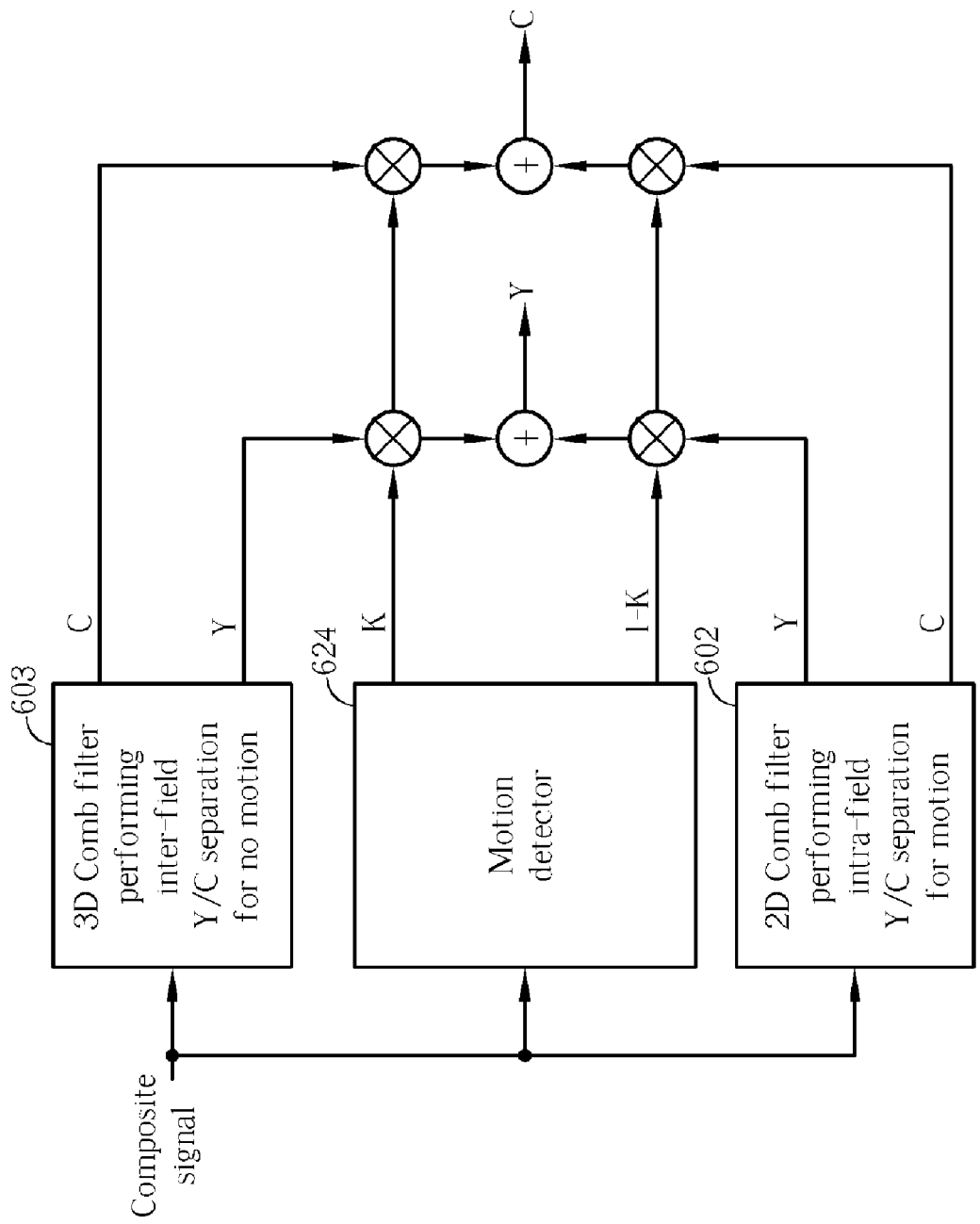
Figure 10:
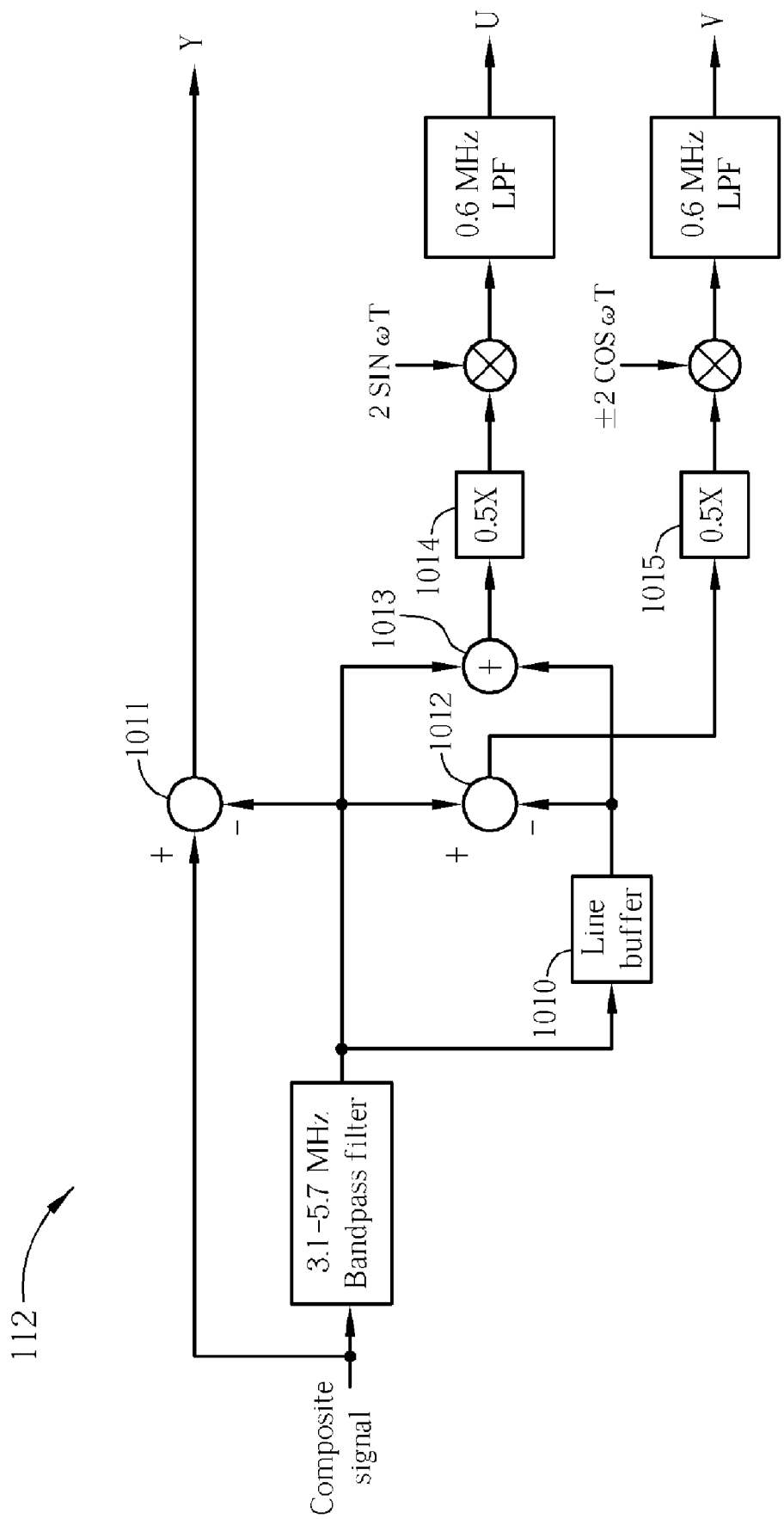
Figure 11:
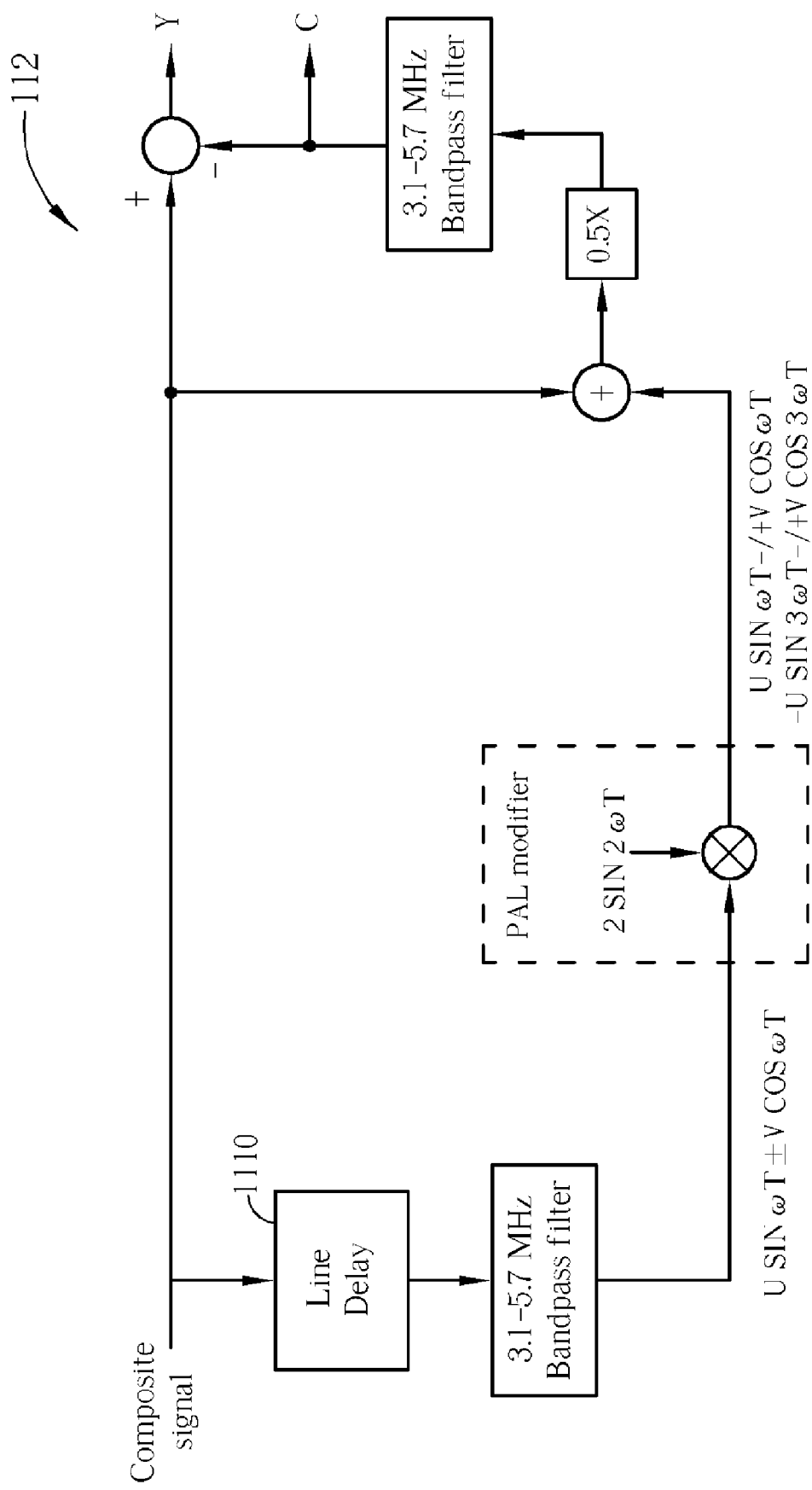
Figure 12:
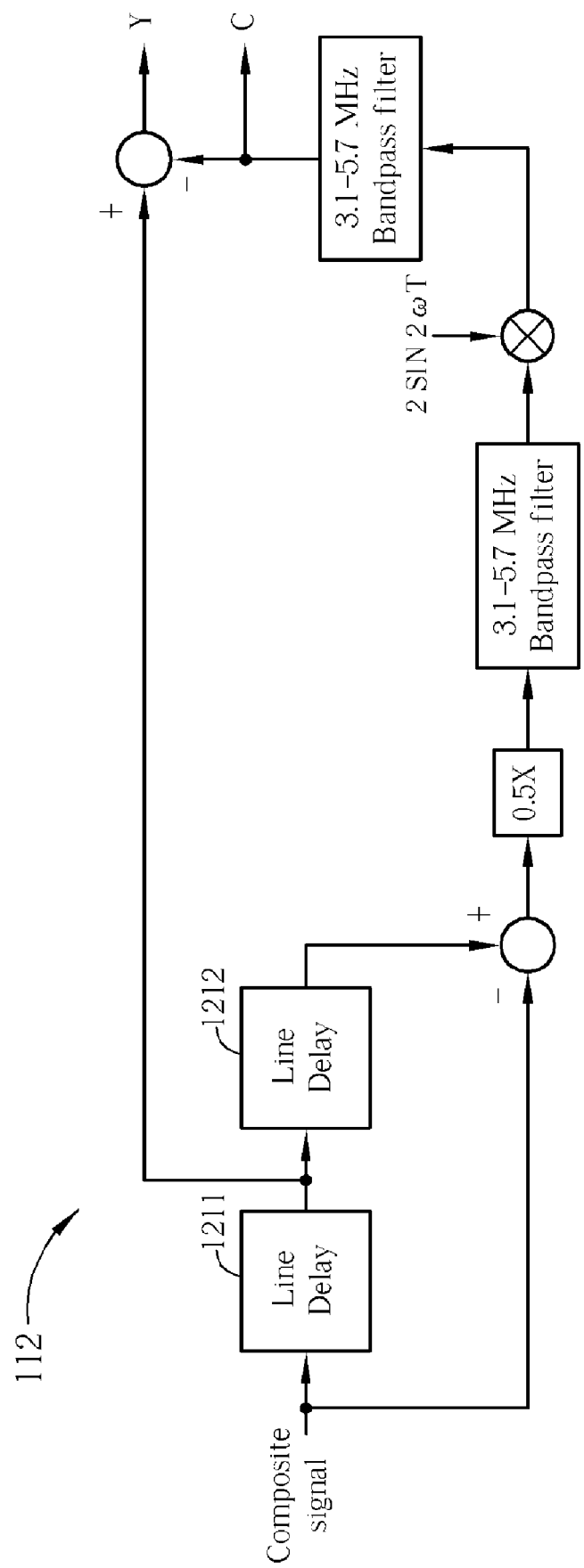

FIG. 8 through FIG. 12 illustrate some implementation details of the VD-CCS module 110 shown in FIG. 2 according to different variations of the first embodiment. FIG. 8 illustrates an example of the 2D comb filter 602 mentioned above, where line delays 811 and 812 correspond to the line buffer 120. FIG. 9 illustrates an example of a combination of the 2D comb filter 602 and the 3D comb filter 603 mentioned above. FIG. 10 illustrates an example of the video decoder 112, where some components such as a line buffer 1010 (corresponding to the line buffer 120), arithmetic units 1011, 1012, and 1013, and amplifiers 1014 and 1015 (labeled "0.5×") can be temporarily utilized by the cross color suppressor 114 while the arithmetic units 1011, 1012, and 1013 and the amplifiers 1014 and 1015 can be implemented within at least one common circuit. FIG. 11 also illustrates an example of the video decoder 112, where some components such as a line delay 1110 corresponding to the line buffer 120 can be temporarily utilized by the cross color suppressor 114. FIG. 12 further illustrates another example of the video decoder 112, where some components such as line delays 1211 and 1212 corresponding to the line buffer 120 can be temporarily utilized by the cross color suppressor 114.

In contrast to the related art, the present invention circuits and methods greatly reduce the aforementioned additional requirements of field/frame buffer(s), line buffer(s), and calculation logic, and further greatly reduce the aforementioned additional requirements of memory access bandwidth.

Those skilled in the art will readily observe that numerous modifications and alterations of the device and method may be made while retaining the teachings of the invention.

What is claimed is:

1. A video processing circuit capable of processing a composite signal and a non-composite signal, comprising:
    a line buffer;
    a frame buffer;
    a video decoder for decoding the composite signal by utilizing the line buffer and the frame buffer as temporary buffers of the video decoder;
    a cross color suppressor for performing color suppression on the non-composite signal by utilizing the line buffer and the frame buffer as temporary buffers of the cross color suppressor; and
    a path controller, coupled to the video decoder and the cross color suppressor, for coupling the line buffer and the frame buffer to the video decoder or the cross color suppressor when utilization of the line buffer and the frame buffer is required.

2. The video processing circuit of claim 1, wherein the path controller determines whether the line buffer and the frame buffer are coupled to the video decoder or the cross color suppressor according to whether the composite signal or the non-composite signal is received.

3. The video processing circuit of claim 1, wherein the video decoder and the cross color suppressor comprise at least one common circuit capable of being temporarily utilized as a portion of the video decoder and capable of being temporarily utilized as a portion of the cross color suppressor.

4. The video processing circuit of claim 3, wherein the video decoder is capable of utilizing at least the common circuit and the line buffer as a two-dimensional (2D) comb filter, and the cross color suppressor is capable of utilizing at least the common circuit and the line buffer as a filter.

5. The video processing circuit of claim 4, wherein the filter is a vertical filter.

6. The video processing circuit of claim 4, wherein the filter is substantially equivalent to the 2D comb filter or a variation of the 2D comb filter.

7. The video processing circuit of claim 3, wherein the video decoder is capable of utilizing at least the common circuit and the frame buffer as a three-dimensional (3D) comb filter, and the cross color suppressor is capable of utilizing at least the common circuit and the frame buffer as a filter.

8. The video processing circuit of claim 7, wherein the filter is a temporal filter.

9. The video processing circuit of claim 7, wherein the filter is substantially equivalent to the 3D comb filter or a variation of the 3D comb filter.

10. The video processing circuit of claim 3, wherein the common circuit comprises at least one arithmetic unit, at least one multiplier, and/or at least one amplifier.

11. The video processing circuit of claim 3, wherein the video decoder is capable of utilizing at least the common circuit and the frame buffer as a first motion detector, and the cross color suppressor is capable of utilizing at least the common circuit and the frame buffer as a second motion detector.

12. The video processing circuit of claim 11, wherein the second motion detector is substantially equivalent to the first motion detector or a variation of the first motion detector.

13. The video processing circuit of claim 1, wherein the video decoder is capable of utilizing a combination of at least the line buffer and at least one calculation circuit as a two-dimensional (2D) comb filter, and the cross color suppressor is capable of utilizing a combination of at least the line buffer and at least one calculation circuit as a filter.

14. The video processing circuit of claim 13, wherein the filter is a vertical filter.

15. The video processing circuit of claim 13, wherein the filter is substantially equivalent to a variation of the 2D comb filter.

16. The video processing circuit of claim 13, wherein the calculation circuit comprises at least one arithmetic unit, at least one multiplier, and/or at least one amplifier.

17. The video processing circuit of claim 1, wherein the video decoder is capable of utilizing a combination of at least the frame buffer and at least one calculation circuit as a three-dimensional (3D) comb filter, and the cross color suppressor is capable of utilizing a combination of at least the frame buffer and at least one calculation circuit as a filter.

18. The video processing circuit of claim 17, wherein the filter is a temporal filter.

19. The video processing circuit of claim 17, wherein the filter is substantially equivalent to a variation of the 3D comb filter.

20. The video processing circuit of claim 17, wherein the calculation circuit comprises at least one arithmetic unit, at least one multiplier, and/or at least one amplifier.

21. The video processing circuit of claim 1, wherein the path controller comprises:
    at least one multiplexer for multiplexing signal(s) within the video processing circuit; and
    an input source detector for detecting whether the composite signal or the non-composite signal is received.

22. The video processing circuit of claim 21, wherein the input source detector controls signal selection of at least one multiplexer within the path controller.

23. The video processing circuit of claim 21, wherein a motion detector within the video processing circuit controls signal selection of at least one multiplexer within the path controller.

24. A video processing method capable of processing a composite signal and a non-composite signal, comprising:
   providing a line buffer;
   providing a frame buffer;
   decoding the composite signal by utilizing the line buffer and the frame buffer as temporary buffers of a video decoder;
   performing color suppression on the non-composite signal by utilizing the line buffer and the frame buffer as temporary buffers of a cross color suppressor; and
   coupling the line buffer and the frame buffer to the video decoder or the cross color suppressor when utilization of the line buffer and the frame buffer is required.

25. The video processing method of claim 24, wherein the step of coupling the line buffer and the frame buffer to the video decoder or the cross color suppressor when utilizing the line buffer and the frame buffer is required further comprises:
   determining whether the line buffer and the frame buffer are coupled to the video decoder or the cross color suppressor according to whether the composite signal or the non-composite signal is received.

26. The video processing method of claim 24, further comprising:
   providing at least one common circuit capable of being temporarily utilized as a portion of the video decoder and capable of being temporarily utilized as a portion of the cross color suppressor.

27. The video processing method of claim 24, wherein the video decoder and the cross color suppressor are distinct components.

* * * * *